United States Patent
Hsiao et al.

(10) Patent No.: US 7,065,142 B2
(45) Date of Patent: Jun. 20, 2006

(54) ADSL ENCODER AND DECODER

(75) Inventors: Pei-Chieh Hsiao, Hsinchu (TW);
Hsin-Min Wang, Hsinchu (TW);
Huan-Tang Hsieh, Hsinchu (TW)

(73) Assignee: Realtek Semiconductor Corp. (TW)

( * ) Notice: Subject to any disclaimer, the term of this patent is extended or adjusted under 35 U.S.C. 154(b) by 803 days.

(21) Appl. No.: 10/103,471

(22) Filed: Mar. 21, 2002

(65) Prior Publication Data
US 2002/0136238 A1  Sep. 26, 2002

(30) Foreign Application Priority Data
Mar. 22, 2001  (TW) ............................... 90106700 A

(51) Int. Cl.
*H04B 14/04* (2006.01)
*H04B 14/06* (2006.01)
*H03M 3/00* (2006.01)

(52) U.S. Cl. .................. 375/242; 375/265; 341/143

(58) Field of Classification Search ............. 375/260, 375/261, 295, 298, 222, 242, 265; 341/143; 714/723, 759, 786
See application file for complete search history.

(56) References Cited

U.S. PATENT DOCUMENTS 6,754,283 B1 *  6/2004  Li ............................. 375/265
6,834,088 B1 * 12/2004  Agami et al. .............. 375/324

* cited by examiner

*Primary Examiner*—Young T. Tse
*Assistant Examiner*—Sam K. Ahn

(57) ABSTRACT

The present invention is an ADSL encoder and decoder. Wherein, the ADSL encoder comprises a digital signal processor, a buffer, a bit extractor and a constellation point mapper. The digital signal processor delivers data bits to the buffer, and again the delivered data bits are transmitted to the bit extractor by buffer. Bit extractor shifts partial received data bits to an extracted data. The constellation point mapper processes constellation point mapping operation corresponding to the extracted data based on transmitted bits that a sub-carrier can transmit. The ADSL decoder comprises a constellation decoder, a bit packet component and a buffer. The constellation decoder combines a horizontal axis data and a vertical axis data to packed data depending on constellation decoding procedures. The bit packet component stores extracted data to digital data in sequence, and the digital data is stored by buffer in sequence as well, then transmitted to digital signal processor.

3 Claims, 6 Drawing Sheets

ADSL ENCODER AND DECODER

FIELD OF THE INVENTION

The present invention is related to an ADSL network component, especially about an ADSL encoder and decoder.

BACKGROUND OF THE INVENTION

As increasing of a large amount of data transmission, requirements of bandwidth on the network are gradually advanced. To reach the requirements on network bandwidth, there are many transmission tools produced, which as ISDN modem, cable modem, asymmetrical digital subscriber line (ADSL), etc, wherein ADSL is the most type to be used for a wideband transmission.

Each transmission type has its own encoder and decoder for its convenience and speed. Talking about ADSL, general affair is to individually install a memory device to an ADSL encoder and an ADSL decoder. The memory device stores a constellation diagram when encoding and decoding. While the ADSL encoder/decoder encoding/decoding data for transmitting/receiving, encode/decode parameters comparative to constellation diagrams in the memory devices shall be found according to at the time of encoding/decoding conditions. After the encoding/decoding parameters being found, data for transmitting/receiving just can be processed for continuing encode/decode process.

As a conclusion, the prior arts of encoder and decoder are to install storage devices having constellation diagrams firstly; the encode/decode process is then executed after the comparative encode/decode parameters being found.

Based on the aforesaid issues, the present inventor of the patent has being studied and referred to practical experiences and theory for designing and effectively improving the prior arts.

SUMMARY OF THE INVENTION

The first objective of the present invention is to offer an ADSL encoder and decoder, which rapidly encodes data for transmitting and decodes data for receiving without constellation diagrams.

The second objective of the present invention is to offer an ADSL encoder to handle digital data. The digital data comprises at least one bit, and a sub-carrier for transmitting includes data together with transmitted bits. The ADSL encoder comprises a digital signal processor, a buffer, a bit extractor and a constellation point mapper. The digital signal processor transmits digital data to the buffer, and buffer receives the digital data from digital signal processor and stores bits in digital data in sequence. The bit extractor receives the digital data one byte by one byte from buffer and shifts the aforesaid data including transmitted bits to extracted data. The constellation point mapper starts constellation point mapping operation corresponding to extracted data based on transmitted bits.

The third objective of the present invention is to offer an ADSL decoder to process horizontal axis data and vertical axis data input from exterior. The ADSL decoder comprises a constellation point demapper, a bit packet component and a buffer. The constellation point demapper combines the horizontal axis data and the vertical axis data to a set of the extracted data based on constellation decoding procedure. The bit packet component stores the extracted data to become digital data with at least one bit in sequence. The buffer stores the digital data in sequence from bit packet components and transmits digital data to the digital signal processor.

The present invention adopts logic circuits to make ADSL encoder and decoder dealing with encoding and decoding procedures without searching constellation diagram, and further, the storage device in ADSL encoder and decoder is no longer existed.

The appended drawings will provide further illustration of the present invention, together with description; serve to explain the principles of the invention.

DETAILED DESCRIPTION OF THE PRESENT INVENTION

Figure 1:
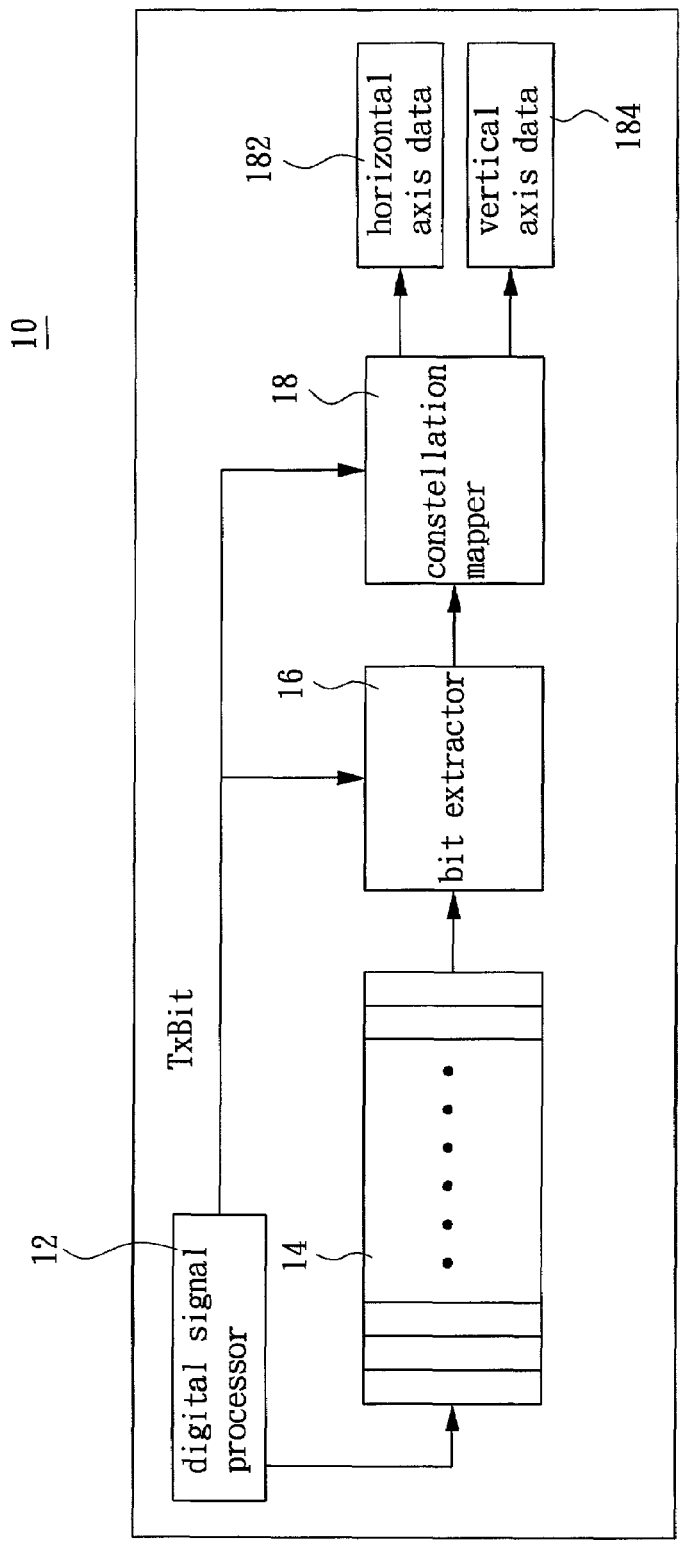
FIG. 1 is a block diagram of the first preferred embodiment of the ADSL encoder for the present invention.

Please refer to FIG. 1, which is a block diagram of the first preferred embodiment of the ADSL encoder for the present invention. The ADSL encoder 10 comprises a digital signal processor 12, a buffer 14, a bit extractor 16 and a constellation point mapper 18. The digital signal processor 12 transmits digital data to the buffer 14. The buffer 14 receives and stores the digital data to the bit extractor 16 in sequence. Bit extractor 16 receives digital data from the buffer 14 one byte by one byte and shifts a TxBit defined as a total number of the transmitted data bits to extracted data 166. The constellation point mapper 18 starts constellation point mapping operation corresponding to extracted data 166 based on transmitted bits (TxBit).

Figure 2A:
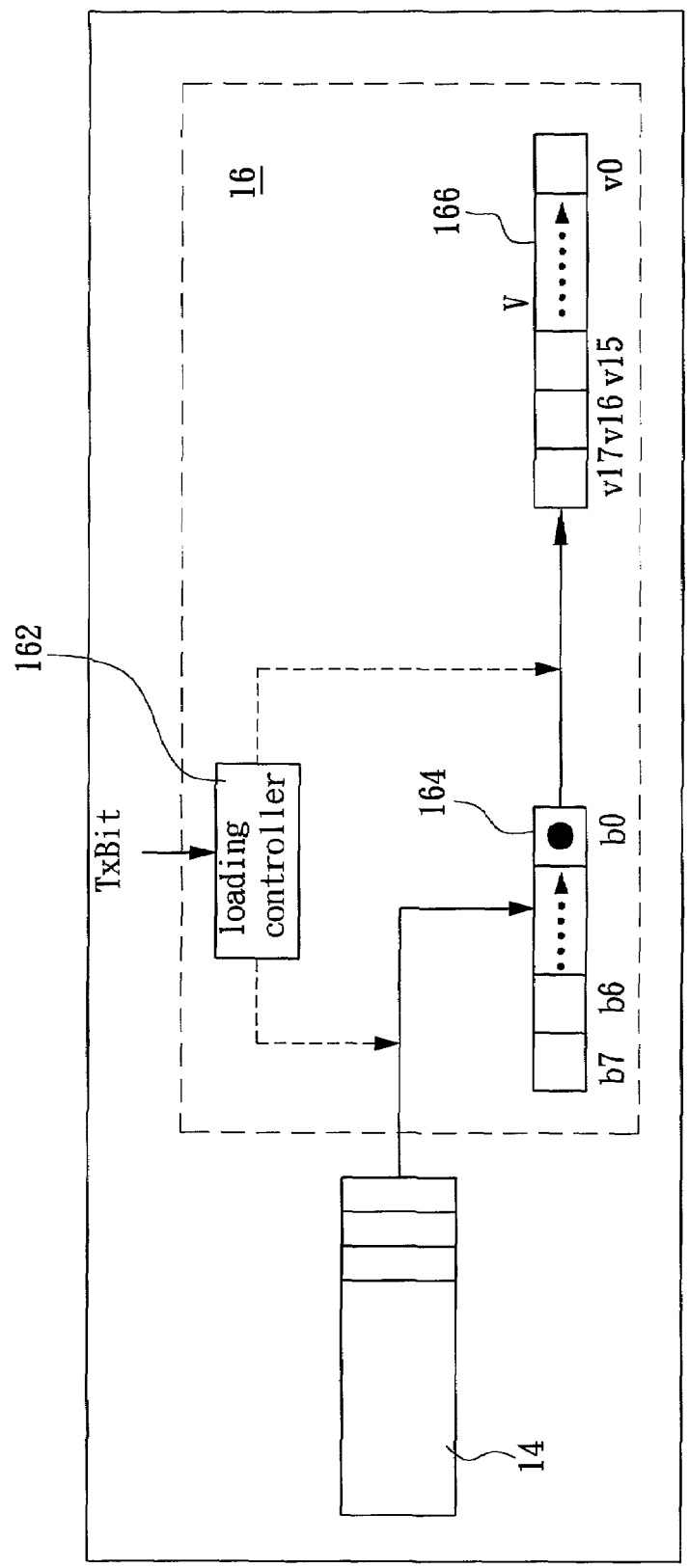
FIG. 2A is a block diagram of the internal bit extractor of the preferred embodiment in FIG. 1.

Following will be further described for ADSL encoder manipulation. Please refer to FIG. 2A, which is a block diagram of the bit extractor 16 of the preferred embodiment in FIG. 1. Bit extractor 16 comprises a byte storage 164 for storing the transmitted data bits from buffer 14, a set of extracted data 166 and a loading controller 162. The transmitted data bits in the buffer 14 is transmitted to the byte storage 164 by every single byte, consequently, byte storage 164 shifts the data bits to the extracted data 166 one after the other. Before every encoding, the extracted data is reset to 0x30000. In the preferred embodiment, the loading controller 162 is to control that the transmitted data is forwarded or not, and a control method for loading controller 162 is based on the transmitted bits (TxBit) to control the data forwarding. The transmitted bits are defined as the data bits transmitted in a sub-carrier. For example, if the transmitted bits (TxBit) are b; amount of the constellation points are $2^b$. After all data in byte storage 164 shifting to extracted data 166, loading controller 162 lets one byte of data bit in buffer 14 load into byte storage 164. Besides, when an amount of data bits in byte storage 164 equal to transmitted bits forwarding to extracted data 166, loading controller 162 temporarily stops forwarding data from byte storage 164 to extracted data 166.

Figure 2B:
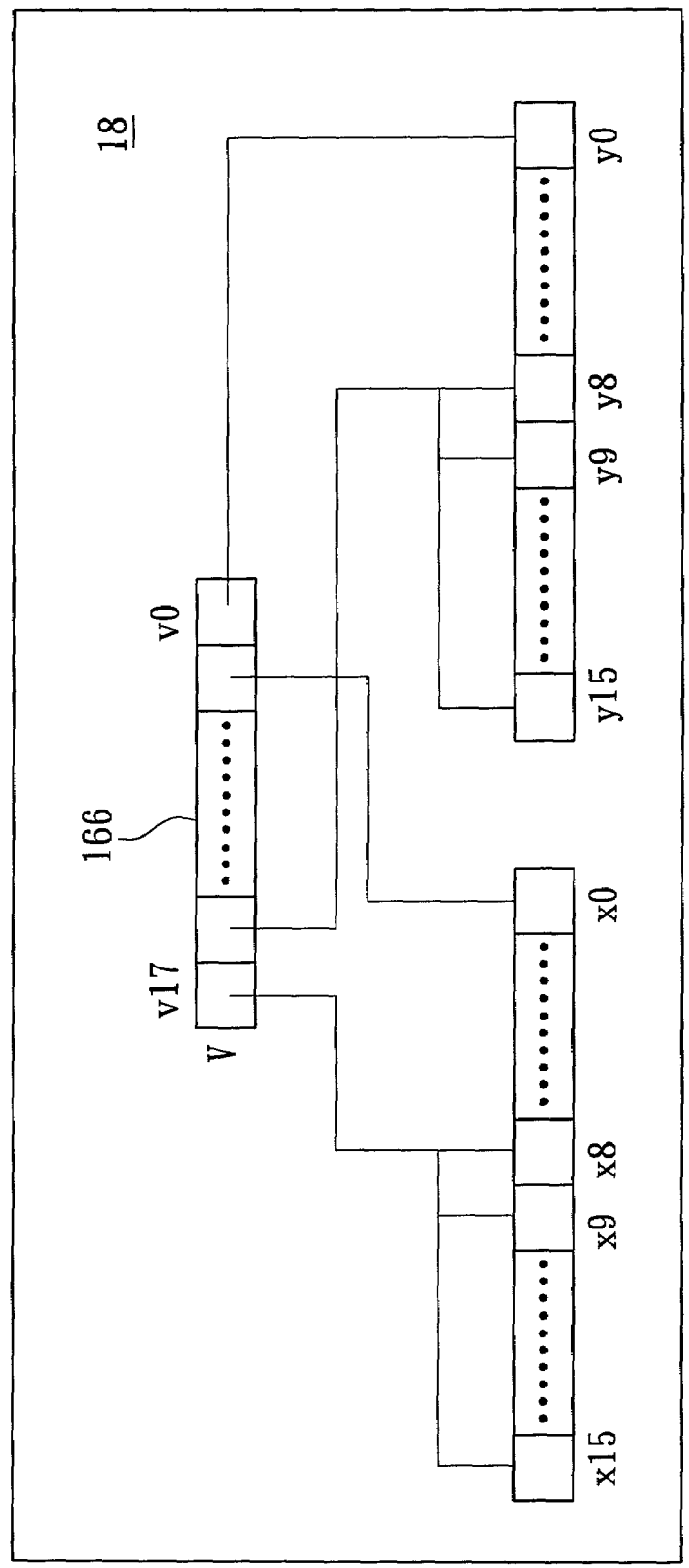
FIG. 2B is a scheme of the constellation point mapper of the preferred embodiment in FIG. 1.

After data bits whose amount equal to transmitted bits being forwarded into extracted data 166, constellation point mapper 18 starts point-mapping operation based on the value of transmitted bits. Please refer to FIG. 2B, which is a scheme of the constellation point mapper 18 of the preferred embodiment in FIG. 1. A notice is that extracted data 166 is transmitted from bit extractor 16 to constellation point mapper 18, and therefore extracted data 166 is appeared both in FIG. 2A and FIG. 2B. This is not to limit following conditions: a storage device for storing extracted data 166 in between bit extractor 16 and constellation point mapper 18, two storage devices in both, none in both or any others.

In constellation point mapper 18, extracted data 166 is started constellation point mapping operation based on transmitted bits. The operation shall be engaged by logic circuits or cooperation of software and hardware, hence there is no corresponding circuits shown in figure, and instead of some formulas. Following is formulas of constellation corresponding to transmitted bits, and v17 represents the highest bit of extracted data 166; following are v16, v15, etc., and the last one is v0; assuming a value of the transmitted bits is b, then:

(1) When b is even, altering is not needed.
(2) When b is equal to 3, then, $$X_c = \overline{v17} \cdot v16 + v17 \cdot \overline{v15};$$

$$Y_c = \overline{v17} \cdot v15 + v17 \cdot v16;$$

shifting extracted data 166 one bit toward right;
v17=$X_c$; and
v16=$Y_c$.

(3) When b is odd and greater than 3, then, $$X_c = v16 \cdot (\overline{v17} + \overline{v15} + v14) + v17 \cdot \text{shifting extracted data } \overline{v15} \cdot v14;$$

$$Y_c = v15 \cdot (\overline{v17} + v16) + v17 \cdot v13 \cdot (v15 + v16);$$

$$X_{c-1} = v16 \cdot (\overline{v17} + v15 + \overline{v14}) + v17 \cdot \overline{v15} \cdot \overline{v14};$$

$$Y_{c-1} = v15 \cdot (\overline{v17} + v16) + v17 \cdot \overline{v13} \cdot (v15 + v16);$$

shifting extracted data 166 one bit toward right;
v17=$X_c$;
v16=$Y_c$;
v15=$X_{c-1}$; and
v14=$Y_{c-1}$.

When above constellation point mapping operation is done, each bit in extracted data 166 is transmitted to the horizontal axis data 182 and the vertical axis data 184 (shown in FIG. 1) individually. Wherein, from the lowest bit of v0 to the highest bit of v16, the bits in extracted data 166 are stored in vertical axis data one bit by one bit. Further detail is v0 is filled out in vertical axis data of y0, v2 is filled out in vertical axis data of y1 and v4 is filled out in vertical axis data of y2, till v16 in y8. Other bits in vertical axis data as y9 to y15 are filled out with a value of v16 for each. Comparatively, from a second lowest bit of v1 to a bit of v17, the bits in extracted data 166 are stored in horizontal axis data one bit by one bit. Which means v1 is filled out in horizontal axis data of x0, v3 is filled out in horizontal axis data of x1, v5 is filled out in horizontal axis data of x2, till v17 in x8. Other bits in horizontal axis data as x9 to x15 are filled out with a value of v17 for each.

After above operation, horizontal axis data and vertical axis data shall be individually forwarded to a signal-receiving end via ADSL network and ADSL dispatching end. After the signal-receiving end receiving the data, decoder decodes the data to transfer correct digital information.

Figure 3:
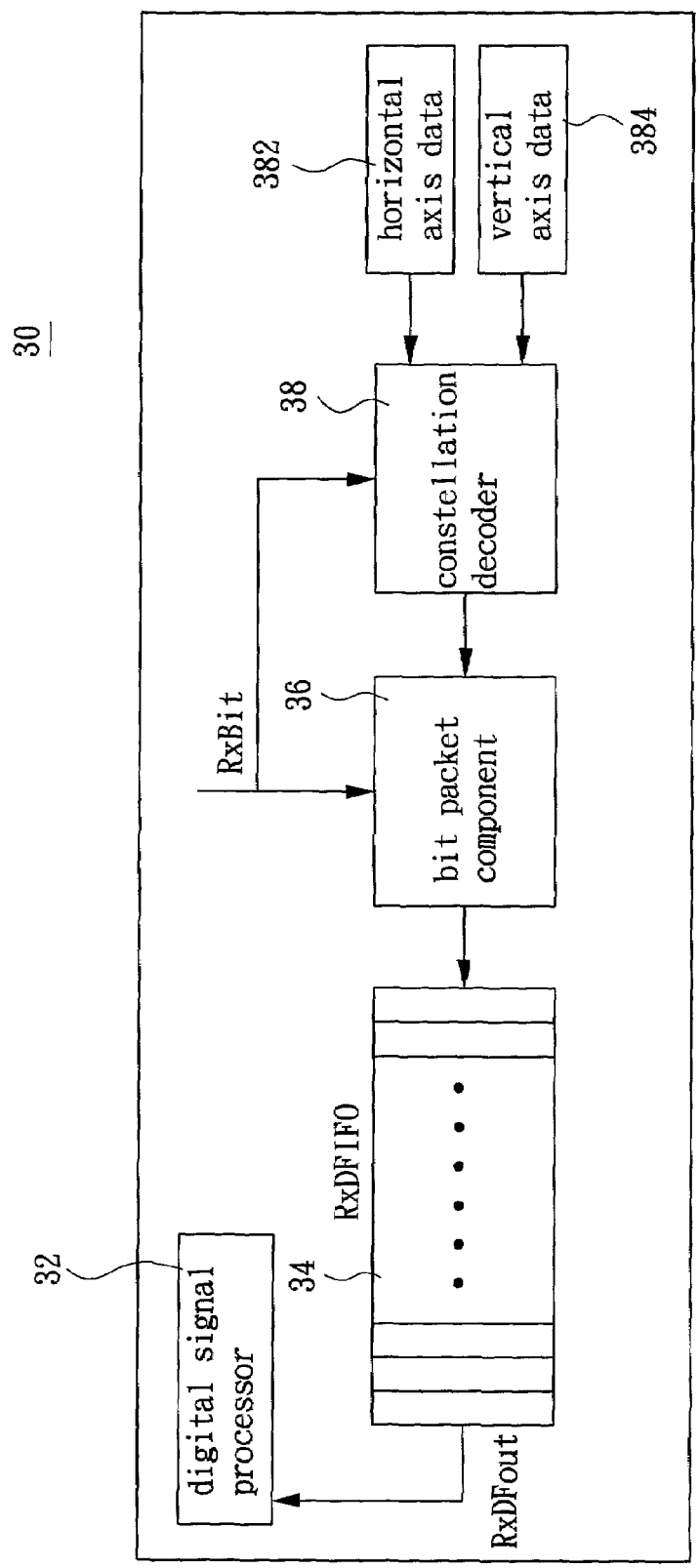
FIG. 3 is a block diagram of the first preferred embodiment of the ADSL decoder for the present invention.

Please refer to FIG. 3, which is a block diagram of the first preferred embodiment of the ADSL decoder for the present invention. In the embodiment, an ADSL decoder 30 comprises a digital signal processor 32, a buffer 34, a bit packet component 36 and a constellation point demapper 38. X-axis constellation data 382 and y-axis constellation data 384 from ADSL network are individually input into the constellation point demapper 38 for decoding.

Figure 4A:
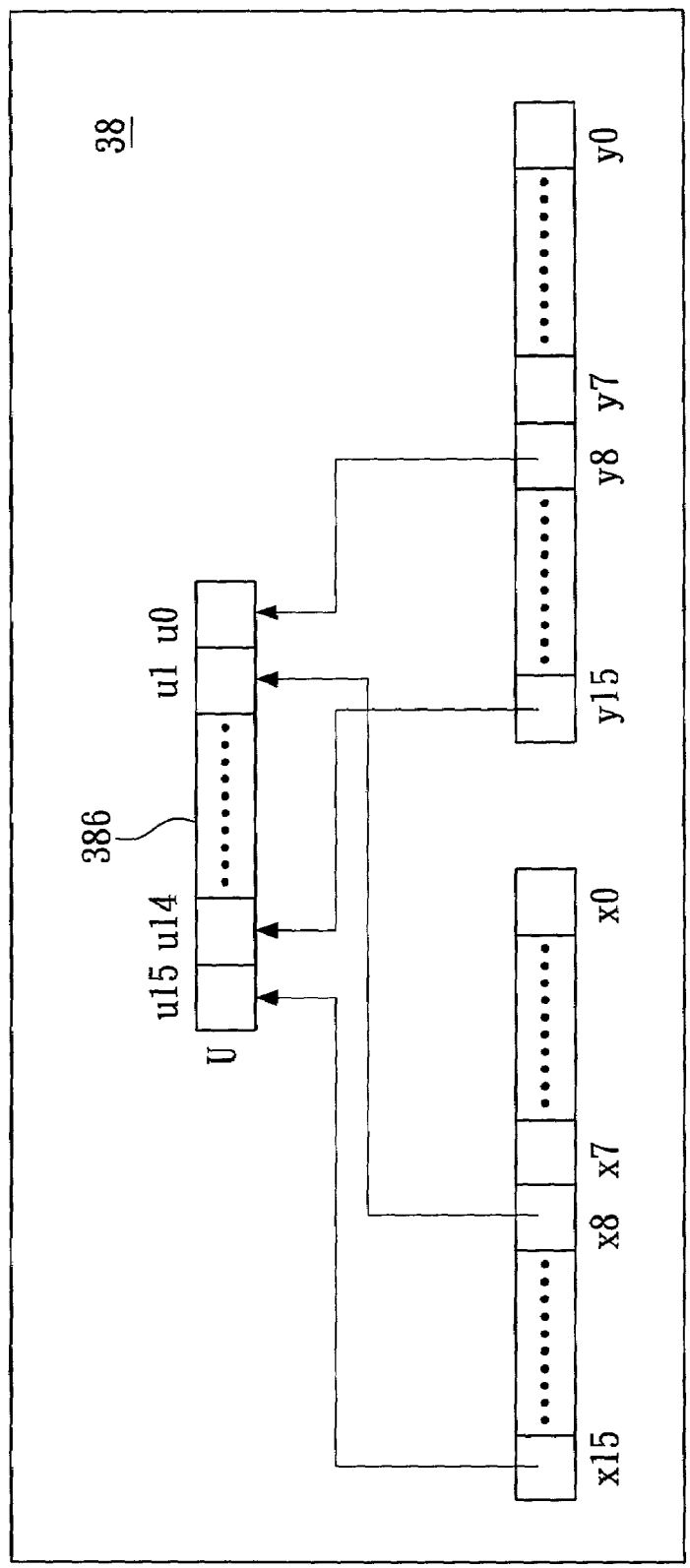
FIG. 4A is a scheme of the constellation point demapper of the preferred embodiment in FIG. 3.

Please refer to FIG. 4A, which is a scheme of the constellation point demapper 38 of the preferred embodiment in FIG. 3. Wherein, from the highest bit of packed data 386, a method of filling out one byte of data with an interval of a bit is used to fill the highest eight bits (x15 to x8) of horizontal axis data out into packed data 386 in sequence. Which means an x15 is in a μ15, an x14 is in a μ13, an x13 is in a μ11, till an x8 in a μ1. Comparatively, from a second highest bit (μ14) of packed data 386, a method of filling out one byte of data with an interval of a bit is used to fill the highest eight bits (y15 to y8) of vertical axis data out into packed data 386 in sequence. Which means a y15 is in a μ14, a y14 is in a μ12, a y13 is in a μ10, till y8 in a μ0.

Hence, different constellation decoding procedures are processed, because aforesaid the value of receiving bits are different than the transmitted bits from the sub-carrier on ADSL. Therefore, assuming a value of RxBit from constellation point demapper 38 in FIG. 3 is b, and the constellation decoding procedures according to a difference of value b are as following:

(1) When b is even:
  shifting packed data 386 16-b bits toward right; and
  shifting from the lowest bit in packed data 386 b bits toward right to bit packet component 36.

(2) When b is equal to 3:

$$X_b = \mu15 \oplus \mu13 + \mu14 \oplus \mu12;$$

shifting packed data 386 one bit toward left;
  μ15+$X_b$;
  shifting packed data 386 16-b bits toward right; and
  shifting from the lowest bit in packed data 386 b bits toward right to bit packet component 36.

(3) When b is odd and greater than 3:

$$X_b = \mu15 \oplus \mu13 + \mu14 \oplus \mu12$$

$$Y_b = \mu15 \cdot \mu13 + (\mu15 \oplus \mu13) \cdot \mu14$$

$$Z_b = \mu14 \cdot \mu12 + (\mu14 \oplus \mu12) \cdot \overline{\mu15};$$

shifting packed data 386 16-b bits toward right;
  μ15=$X_b$;
  μ14=$Y_b$;
  μ13=$Z_b$;
  shifting packed data 386 16-b bits toward right; and
  shifting from the lowest bit in packed data 386 b bits toward right to bit packet component 36.

When above constellation decoding procedures are finished, data is then delivered to bit packet component 36. Although, packed data 386 is appeared both in FIG. 4A and FIG. 4B. This is not to limit following conditions: a storage device for storing packed data 386 in between bit packet component 36 and constellation point demapper 38, two storage devices in both, none in both or any others.

Figure 4B:
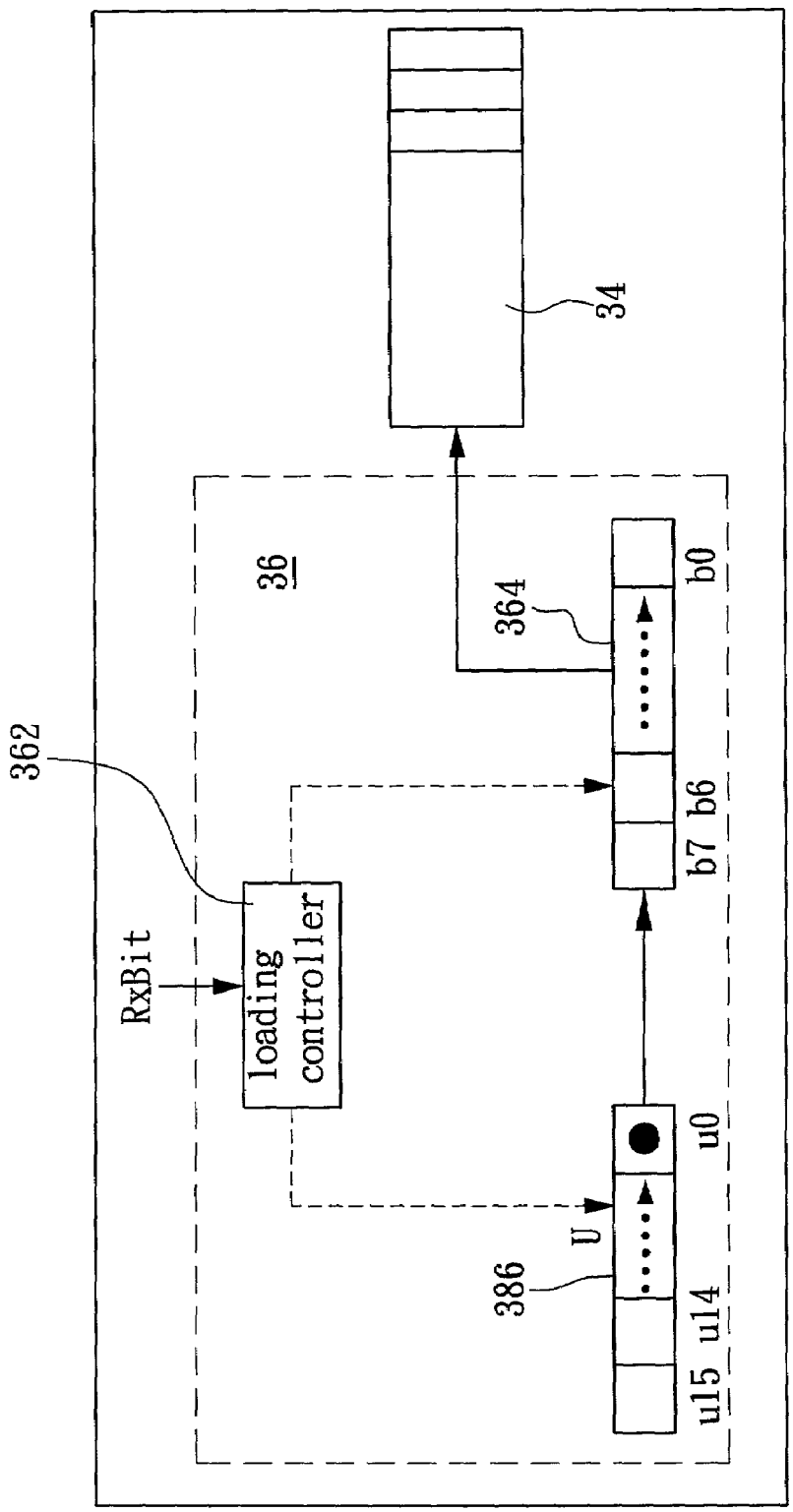
FIG. 4B is a block diagram of the bit packet component of the preferred embodiment in FIG. 3.

Please refer to FIG. 4B, which is a block diagram of the bit packet component 36 of the preferred embodiment in FIG. 3. When data in packed data 386 shifting to a byte storage 364, the available lowest bit is stored firstly, and then the second lowest one. Which means data is stored in b7, then b6, b5, till to b0. A storage controller 362 puts 8 bits (1 byte) in the byte storage 364, and data in byte storage 364 is then transmitted to a buffer 34 when the buffer 34 has enough memory. Continuously, data in buffer 34 is forwarded to digital signal processor 32 for following procedures.

As a conclusion, advantages from the present invention are listed as following: encoding and decoding can be processed without searching constellation diagram. Therefore, a storage device for storing constellation diagram is no longer needed and some time for searching constellation diagram can be saved.

While the present invention has been shown and described with reference to preferred embodiments thereof, and in terms of the illustrative drawings, it should be not considered as limited thereby. Thus, the present invention is infinitely used. However, various possible modification, omission, and alterations could be conceived of by one skilled in the art to the form and the content of any particular embodiment, without departing from the scope and the sprit of the present invention.

The invention is disclosed and is intended to be limited only the scope of the appended claims and its equivalent area.

What is claimed is:

1. An ADSL encoder processing digital data including at least one data bit and a sub-carrier for transmitting data of even bits, the ADSL encoder comprising:
   a digital signal processor outputting the digital data;
   a buffer storing plural data bits of the digital data output from the digital signal processor in sequence;
   a bit extractor receiving the data bits from the buffer one byte by one byte, and shifting the even bits of data to an extracted data; and
   a constellation point mapper starting a constellation point mapping operation corresponding to the extracted data based on the even bits of data, and
   wherein the constellation point mapping operation comprises:
   filling out one byte of a vertical axis data in sequence, starting from the lowest bit of the extracted data, and then every other bit, the rest of the vertical axis data are filled out with a second highest bit of the extracted data; and
   filling out one byte of a horizontal axis data in sequence, starting from the second lowest bit of the extracted data, and then every other bit, the rest of the horizontal axis data are filled out with a highest bit of the extracted data.

2. An ADSL encoder processing digital data including at least one data bit and a sub-carrier for transmitting data of 3 bits, the ADSL encoder comprising:
   a digital signal processor outputting the digital data;
   a buffer storing plural data bits of the digital data output from the digital signal processor in sequence;
   a bit extractor receiving the data bits from the buffer one byte by one byte, and shifting the 3 bits of data to an extracted data; and
   a constellation point mapper starting a constellation point mapping operation corresponding to the extracted data based on the 3 bits of data, and
   wherein the constellation point mapping operation comprises:
   processing an AND operation of an inverse of a highest bit and a second highest bit in the extracted data obtaining a first result, and processing an AND operation of the highest bit and the inverse of a third highest bit obtaining a second result, then processing an OR operation of the first result and the second result obtaining a value defined as a first temporary bit;
   processing an AND operation of the inverse of the highest bit and the third highest bit in the extracted data obtaining a third result, and processing an AND operation of the highest bit and the second highest bit obtaining a fourth result, then processing an OR operation of the third result and the fourth result obtaining a value defined as a second temporary bit;
   shifting the extracted data one bit toward right;
   setting the first temporary bit as the highest bit of the extracted data, and setting the second temporary bit as the second highest bit of the extracted data;
   filling out one byte of a vertical axis data in sequence, starting from the lowest bit of the extracted data, and then every other bit, the rest of the vertical axis data are filled out with the second highest bit of the extracted data; and
   filling out one byte of a horizontal axis data in sequence, starting from the second lowest bit of the extracted data, and then every other bit, the rest of the horizontal axis data are filled out with the highest bit of the extracted data.

3. An ADSL encoder processing digital data including at least one data bit and a sub-carrier for transmitting data of odd bits having a value greater than 3, the ADSL encoder comprising:
   a digital signal processor outputting the digital data;
   a buffer storing plural data bits of the digital data output from the digital signal processor in sequence;
   a bit extractor receiving the data bits from the buffer one byte by one byte, and shifting the odd bits of data that are greater than 3 to an extracted data; and
   a constellation point mapper starting a constellation point mapping operation corresponding to the extracted data based on the odd bits of data that are greater than 3, and
   wherein the constellation point mapping operation comprises:
   processing an OR operation of an inverse of a highest bit, an inverse of a third highest bit and a fourth highest bit in the extracted data obtaining a first OR operation result, and processing an AND operation of the first OR operation result and a second highest bit obtaining a first result;
   processing an AND operation of the highest bit, the inverse of the third highest bit and the fourth highest bit obtaining a second result;
   processing an OR operation of the first result and the second result obtaining a value defined as a first temporary bit;
   processing an OR operation of the inverse of the highest bit and the second highest bit obtaining a second OR operation result, and processing an AND operation of the second OR operation result and the third highest bit obtaining a third result;
   processing an OR operation of the second highest bit and the third highest bit in the extracted data obtaining a third OR operation result, and processing an AND operation of the highest bit and a fifth highest bit obtaining a fourth result;
   processing an OR operation of the third result and the fourth result obtaining a value defined as a second temporary bit;
   processing an OR operation of the inverse of the highest bit, the inverse of the third highest bit and the inverse of the fourth highest bit obtaining a fourth OR operation result, and processing an AND operation of the fourth OR operation result and the second highest bit obtaining a fifth result;

processing an AND operation of the highest bit, the inverse of the third highest bit and the inverse of the fourth highest bit obtaining a sixth result;

processing an OR operation of the fifth result and the sixth result obtaining a value defined as a third temporary bit;

processing an OR operation of the inverse of the highest bit and the second highest bit obtaining a fifth OR operation result, and processing an AND operation of the fifth OR operation result and the third highest bit obtaining a seventh result;

processing an OR operation of the second highest bit and the third highest bit obtaining a sixth OR operation result, and processing an AND operation of the highest bit, the sixth OR operation result and the inverse of the fifth highest bit obtaining an eighth result;

processing an OR operation of the seventh result and the eighth result obtaining a value defined as a fourth temporary bit;

shifting the extracted data one bit toward right;

setting up the first temporary bit as a defined highest bit of the extracted data;

setting up the second temporary bit as a defined second highest bit of the extracted data;

setting up the third temporary bit as a defined third highest bit of the extracted data;

setting up the fourth temporary bit as a defined fourth highest bit of the extracted data;

filling out one byte of a vertical axis data in sequence, starting from the lowest bit of the extracted data, and then every other bit, the rest of the vertical axis data are filled out with the second highest bit of the extracted data; and filling out one byte of a horizontal axis data in sequence, starting from the second lowest bit of the extracted data, and then every other bit, the rest of the horizontal axis data are filled out with the highest bit of the extracted data.

* * * * *